June 9, 1942. A. HRYZACK 2,285,661
FASTENER
Filed Feb. 4, 1941
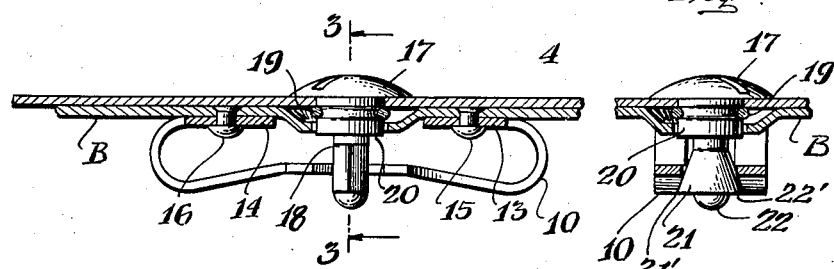
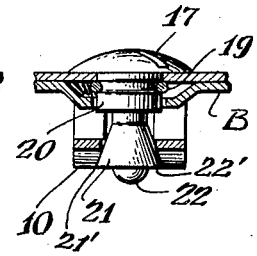
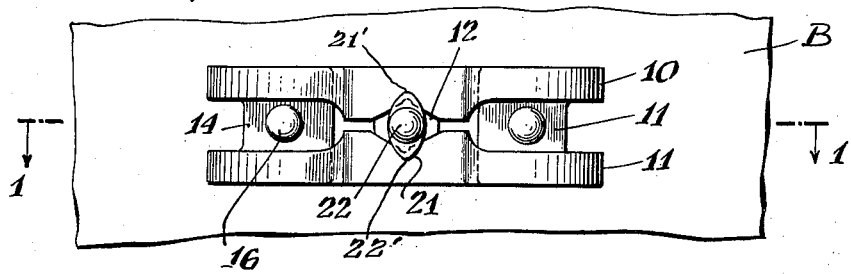
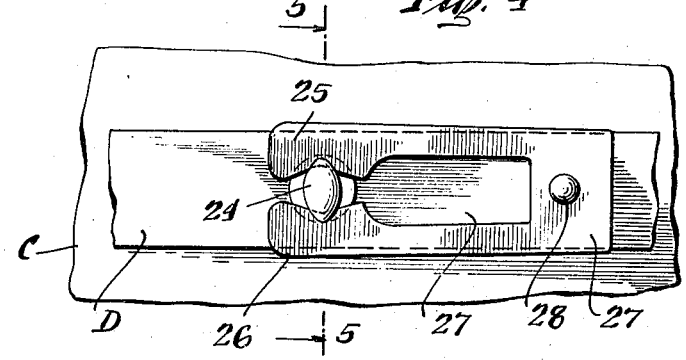
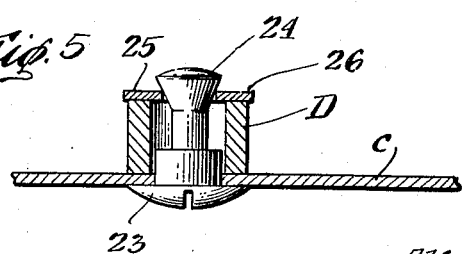
INVENTOR.
Alfred Hryzack
BY
ATTORNEY Patented June 9, 1942

2,285,661

UNITED STATES PATENT OFFICE 2,285,661

FASTENER

Alfred Hryzack, New York, N. Y.

Application February 4, 1941, Serial No. 377,286

1 Claim. (Cl. 24—221)

My invention relates to improvements in fastening devices, particularly fasteners suited for detachably connecting two separate parts or elements such as for instance separate plates, and more particularly my invention relates to a fastener for quickly and readily securing together the parts of aircraft cowling or other aircraft parts and other constructions in which two plates or elements are to be connected.

In the known devices of this character generally one spring was used engaging a specially constructed head which made the construction comparatively complicated and unyielding as well as insecure or unsafe on account of the rapid deterioration of the spring, and moreover necessitated the use of a specially constructed head for engagement by said spring which was comparatively expensive to make.

The fastener constructed according to my invention avoids all these disadvantages by making use of a comparatively wide spring, the branches of which are arranged in juxtaposition separated from one another forming a median, substantially diamond-shaped opening for the passage of a head at the end of a screw and provided with ears engaging the branches of the spring whenever the screw is turned to the left or right. The ends of the spring branches are inwardly turned to present bored feet through the bores of which the fastening rivets or the like are passed.

My invention furthermore relates to a modified form of my fastener suited for the connection of comparatively thick parts to plates or the like as it frequently is the case in airplane construction.

These and other objects and advantages of my invention will become more fully known as the description thereof proceeds and will then be specifically defined in the appended claim.

In the accompanying drawing forming a material part of this disclosure:

Fig. 1 is a sectional side elevation of a fastener constructed according to my invention, the section being taken on line 1—1 of Figure 2.

Fig. 2 is a top plan view of the fastener.

Fig. 3 is a section on line 3—3 of Figure 1.

Fig. 4 is a rear view of a modified form of my fastener.

Fig. 5 is a section on line 5—5 of Figure 4.

As shown in Figures 1 to 3, two plates to be connected by my novel and improved fastener are designated A and B. To the lower face of plate B a split leaf spring is secured, the branches 10 and 11 of which are separated by a median, substantially diamond-shaped opening 12, while the ends of the spring branches are substantially turned down and inwards to form feet 13, 14 provided with openings for the passage of the fastening rivets 15, 16.

The plate A has a median opening forming substantially a seat for the screw head 17 of a bolt 18 held in place by means of a flat, split spring ring 19 engaging beneath the collar 20. The bolt 18 has substantially the form of an inverted vase 21 with laterally protruding ears 21', 22' adapted to engage the edges of the diamond shaped opening 12 of the spring branches, while the extreme lower end of the bolt is substantially rounded, as shown at 22.

In the modified form of my invention as illustrated in Figures 4 and 5, a plate C is to be connected to a comparatively thick element or beam D by means of a screw bolt 23 having a substantially frusto-conically shaped head 24 passing through an opening in beam D and adapted to engage the branches 25, 26 of a leaf spring 27 secured to the beam D as indicated at 28. The inner ends of the spring branches 25, 26 have their inner oppositely disposed ends suitably recessed for allowing the passage of the bolt head which when suitably turned will engage with its beveled shoulders the spring branches. The body of the spring is flared as at 27.

The operation of the fastener will be entirely clear from the above description and simultaneous inspection of the drawing and it will be clear that the simple turning of the screw bolts 17 or 23 in either direction will bring the ears of part 21 or the shoulder of the head 24 in engagement with the spring branches 10, 11 or 25, 26 and thus connect the plates A and B or plate C, and beam D respectively.

It will be understood that I have described and shown the preferred forms of my fastener only as some examples of the many possible ways to practically construct the same, and that I may make such changes in its general arrangement and in the construction of its minor details as come within the scope of the appended claim without departing from the spirit of my invention and the principles involved.

Having thus described my invention, what I claim as new and desire to secure by Letters Patent is:

In a fastening device for firmly but detachably connecting two plates, as described, an elongated, split leaf spring having its ends rounded and re-entrantly bent, inwardly directed feet formed at said ends of the spring engaging one of said plates, means to secure said feet to said plate, the split portion of said spring having a median, substantially diamond-shaped opening, and a bolt having an enlarged screw head seated with its head in a seat formed with the other of said plates and extending with its shaft through both plates, collars on said shaft forming a groove between them, a flat, split ring spring seated in said groove to hold said bolt in place, a substantially inverted vase-like body or member formed with the shaft of said bolt having at one end laterally projecting ears adapted to be passed through the diamond-shaped opening when the bolt is passed through both plates, and to engage the edges of said split in the spring when the bolt is given a turning movement to snap the parts into locking position, to firmly connect the plates with the material of the spring yielding under the pressure of said ears.

ALFRED HRYZACK.